United States Patent
Grayson

(10) Patent No.: US 11,233,691 B2
(45) Date of Patent: Jan. 25, 2022

(54) THIRD GENERATION PARTNERSHIP PROJECT (3GPP) PLUG AND PLAY (PNP) OPERATION IN A HYBRID OPEN RADIO ACCESS NETWORK (O-RAN) ENVIRONMENT

(71) Applicant: Cisco Technology, Inc., San Jose, CA (US)

(72) Inventor: Mark Grayson, Berkshire (GB)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 16/875,272

(22) Filed: May 15, 2020

(65) Prior Publication Data
US 2021/0314211 A1 Oct. 7, 2021

Related U.S. Application Data

(60) Provisional application No. 63/005,771, filed on Apr. 6, 2020.

(51) Int. Cl.
*G06F 15/173* (2006.01)
*H04L 12/24* (2006.01)
(Continued)

(52) U.S. Cl.
CPC ...... *H04L 41/0213* (2013.01); *H04L 41/0803* (2013.01); *H04L 65/1066* (2013.01)

(58) Field of Classification Search
CPC ............. H04L 41/0213; H04L 41/0803; H04L 65/1066
(Continued)

(56) References Cited

U.S. PATENT DOCUMENTS 7,685,295 B2 3/2010 Myers et al.
10,326,532 B2 6/2019 Ashrafi
(Continued)

FOREIGN PATENT DOCUMENTS

EP 3101846 A1 12/2016
WO 2019027711 A1 2/2019
(Continued)

OTHER PUBLICATIONS

D-Ran Alliance, "Management Plane Specification", O-Ran Alliance Working Group 4, Oran-WG4 MP.0-v02.00.00, 2019, p. 149 (Year: 2019).*

(Continued)

*Primary Examiner* — Karen C Tang
(74) *Attorney, Agent, or Firm* — Edell, Shapiro & Finnan, LLC

(57) ABSTRACT

Presented herein are techniques to facilitate Third (3rd) Generation Partnership Project (3GPP) Plug and Play (PnP) operation in a hybrid Open Radio Access Network (O-RAN) architecture. In one example, a method is provided that may include establishing a first network configuration session between a first network entity and a second network entity using first network configuration session triggers, wherein the second network entity is identified in a list of known network entities; repeatedly transmitting second network configuration session triggers to establish a second network configuration session between the first network entity and a third network entity not identified in the list of known network entities; and upon establishing the second network configuration session between the first network entity and the third network entity not identified in the list of known network entities, stopping the transmitting of the second network configuration session triggers.

20 Claims, 6 Drawing Sheets

(51) Int. Cl.
  *H04L 29/06* (2006.01)
  *G06F 15/16* (2006.01)
(58) Field of Classification Search
  USPC .......................................................... 709/224
  See application file for complete search history.

(56) References Cited

U.S. PATENT DOCUMENTS

| | | | |
|---|---|---|---|
| 10,708,141 | B2 | 7/2020 | Berger et al. |
| 10,797,968 | B2 | 10/2020 | Suthar et al. |
| 10,992,497 | B2 | 4/2021 | Patel et al. |
| 11,012,872 | B1 | 5/2021 | Bellamkonda et al. |
| 2019/0245740 | A1* | 8/2019 | Kachhla ............... H04L 41/082 |
| 2020/0110627 | A1 | 4/2020 | Chou et al. |
| 2020/0128414 | A1 | 4/2020 | Mishra et al. |
| 2020/0145175 | A1 | 5/2020 | Hassan Hussein et al. |
| 2020/0204252 | A1 | 6/2020 | Barbieri et al. |
| 2020/0260296 | A1 | 8/2020 | Mishra et al. |
| 2020/0267576 | A1 | 8/2020 | Bedekar et al. |
| 2020/0304408 | A1 | 9/2020 | Suthar et al. |
| 2021/0014737 | A1 | 1/2021 | Yang et al. |
| 2021/0021494 | A1 | 1/2021 | Yao et al. |
| 2021/0045011 | A1 | 2/2021 | Mishra et al. |
| 2021/0045193 | A1 | 2/2021 | Mishra et al. |
| 2021/0144517 | A1 | 5/2021 | Guim Bernat et al. |
| 2021/0176823 | A1 | 6/2021 | Mishra et al. |
| 2021/0243839 | A1 | 8/2021 | Krishnaswamy et al. |

FOREIGN PATENT DOCUMENTS

| | | |
|---|---|---|
| WO | 2019035750 A1 | 2/2019 |
| WO | 2021034906 A1 | 2/2021 |

OTHER PUBLICATIONS

Shekar Sundaramurthy et al, "5G-PNF Plug and Play", Develop Wiki , Confluence, Aug. 7, 2019, 35 pg (Year: 2019).*

Shekar Sundaramurthy et al., "5G—PNF Plug and Play", Developer Wiki, Confluence, Aug. 7, 2019, 35 pages.

E. Voit et al., "Custom Subscription to Event Notifications draft-ietf-netconf-subscribed-notifications-05", NETCONF, Oct. 2, 2017, 33 pages.

3GPP, 3rd Generation Partnership Project; Technical Specification Group Services and System Aspects; Telecommunication management; Data formats for multi-vendor plug and play eNode B connection to the network (Release 15), 3GPP TS 32.509 V15.0.0 (Jun. 2018), 13 pages.

3GPP, 3rd Generation Partnership Project; Technical Specification Group Services and System Aspects; Telecommunication management; Procedure flows for multi-vendor plug-and-play eNode B connection to the network (Release 15), 3GPP TS 32.508 V15.0.0 (Jun. 2018), 20 pages.

3GPP, 3rd Generation Partnership Project; Technical Specification Group Services and System Aspects; Telecommunication management; Self-configuration of network elements; Concepts and requirements (Release 15), 3GPP TS 32.501 V15.0.0 (Jun. 2018), 29 pages.

3GPP, 3rd Generation Partnership Project; Technical Specification Group Services and System Aspects; Management and orchestration; Generic management services; (Release 16), 3GPP TS 28.532 V16.3.0 (Mar. 2020), 230 pages.

Sadayuki Abeta et al., "O-RAN Alliance Standardization Trends", NTT DOCOMO Technical Journal, vol. 21, No. 1, Jul. 2019, 8 pages.

ONAP, "VES Collector", ONAP, 2019, 22 pages, retrieved from Internet Apr. 18, 2020; https://docs.onap.org/en/elalto/submodules/dcaegen2.git/docs/sections/apis/ves.html.

K. Watsen et al., "NETCONF Call Home and RESTCONF Call Home", Internet Engineering Task Force (IETF), Feb. 2017, 13 pages.

R. Enns, Ed. et al., "Network Configuration Protocol (NETCONF)", Internet Engineering Task Force (IETF), Jun. 2011, 113 pages.

M. Scott et al., "YANG Module for NETCONF Monitoring", Internet Engineering Task Force (IETF), Oct. 2010, 28 pages.

R. Enns, Ed. et al., "NETCONF Configuration Protocol", Network Working Group, Dec. 2006, 95 pages.

T. Lemon et al., "Node-specific Client Identifiers for Dynamic Host Configuration Protocol Version Four (DHCPv4)", Network Working Group, Feb. 2006, 12 pages.

S. Alexander et al., "DHCP Options and BOOTP Vendor Extensions", Network Working Group, Mar. 1997, 34 pages.

O-RAN Alliance, "Management Plane Specification", O-RAN Alliance Working Group 4, ORAN-WG4.MP.0-v02.00.00, 2019, 149 pages.

O-RAN Alliance, "O-RAN Operations and Maintenance Interface Specification V02.00", O-RAN-WG1.O1-Interface-v02.00, 2019, 47 pages.

Cisco Open Plug-n-Play Agent Configuration Guide, Cisco IOS Release 15SY, Cisco, Dec. 16, 2014, 35 pages.

ONAP, "8.61.7.3.7.1 Datatype: pnfRegistrationFields", ONAP Master Documentation, 1 page, retrieved from Internet Aug. 11, 2021; https://docs.onap.org/projects/onap-vnfrqts-requirements/en/latest/Chapter8/ves_7_2/ves_event_listener_7_2.html#datatype-pnfregistrationfields.

Marge Hillis et al., "O-RAN Working Group 1 O-RAN Operations and Maintenance Interface Specification", O-RAN. WG1.O1-Interface,0-v03.00, O-RAN Alliance, revised Mar. 3, 2020, 52 pages.

O-RAN Alliance, "O-RAN Alliance Working Group 4 Management Plane Specification", O-RAN.WG4.MP.0-v03.00, revised Apr. 17, 2020, 178 pages.

International Telecommunication Union, "Operation, administration and maintenance (OAM) functions and mechanisms for Ethernet-based networks", G.8013/Y.1731, Aug. 2015, 102 pages.

O-RAN Alliance, "O-RAN Alliance Working Group 4 Management Plane Specification", ORAN-WG4.MP.0-v01.00, revised Mar. 11, 2019, 125 pages.

O-RAN Alliance, "This module defines the YANG definitions for managing the O-RAN Radio Unit management plane Interface", revised Jul. 26, 2021, www.o-ran.org, 6 pages.

3GPP, 3rd Generation Partnership Project; Technical Specification Group Services and System Aspects; Telecommunication management; Inventory Management (IM) network resources Integration Reference Point (IRP) Network Resource Model (NRM) (Release 11), 3GPP TS 32.692 V11.0.0, Sep. 2012, 26 pages.

Trevor Lovett, "8.61. Service: VES Event Listener 7.2.1", ONAP Master Documentation, Revised Jan. 16, 2021, 98 pages; https://docs.onap.org/projects/onap-vnfrqts-requirements/en/latest/Chapter8/ves_7_2/ves_event_listener_7_2.html.

Mugen Peng et al., "Recent Advances in Underlay Heterogeneous Networks: Interference Control, Resource Allocation, and Self-Organization", IEEE Communication Surveys & Tutorials, vol. 17, No. 2, Second Quarter 2015, May 19, 2015, 30 pages.

Mustafa Y. Arslan et al., "Software-Defined Networking in Cellular Radio Access Networks: Potential and Challenges", Extremely Dense Wireless Networks, IEEE Communications Magazine, Jan. 2015, 7 pages.

O-RAN Project, "Transport Layer and ORAN Fronthaul Protocol Implementation", 2019, revision 70d9d920, 22 pages; retrieved from Internet Aug. 13, 2021; https://docs.o-ran-sc.org/projects/o-ran-sc-o-du-phy/en/latest/Transport-Layer-and-ORAN-Fronthaul-Protocol-lmplementation_fh.html.

Ericsson AB, Huawei Technologies Co. Ltd, NEC Corporation and Nokia, "Common Public Radio Interface: eCPRI nterface Specification", eCPRI Specification V2.0 (May 10, 2019), 109 pages.

* cited by examiner

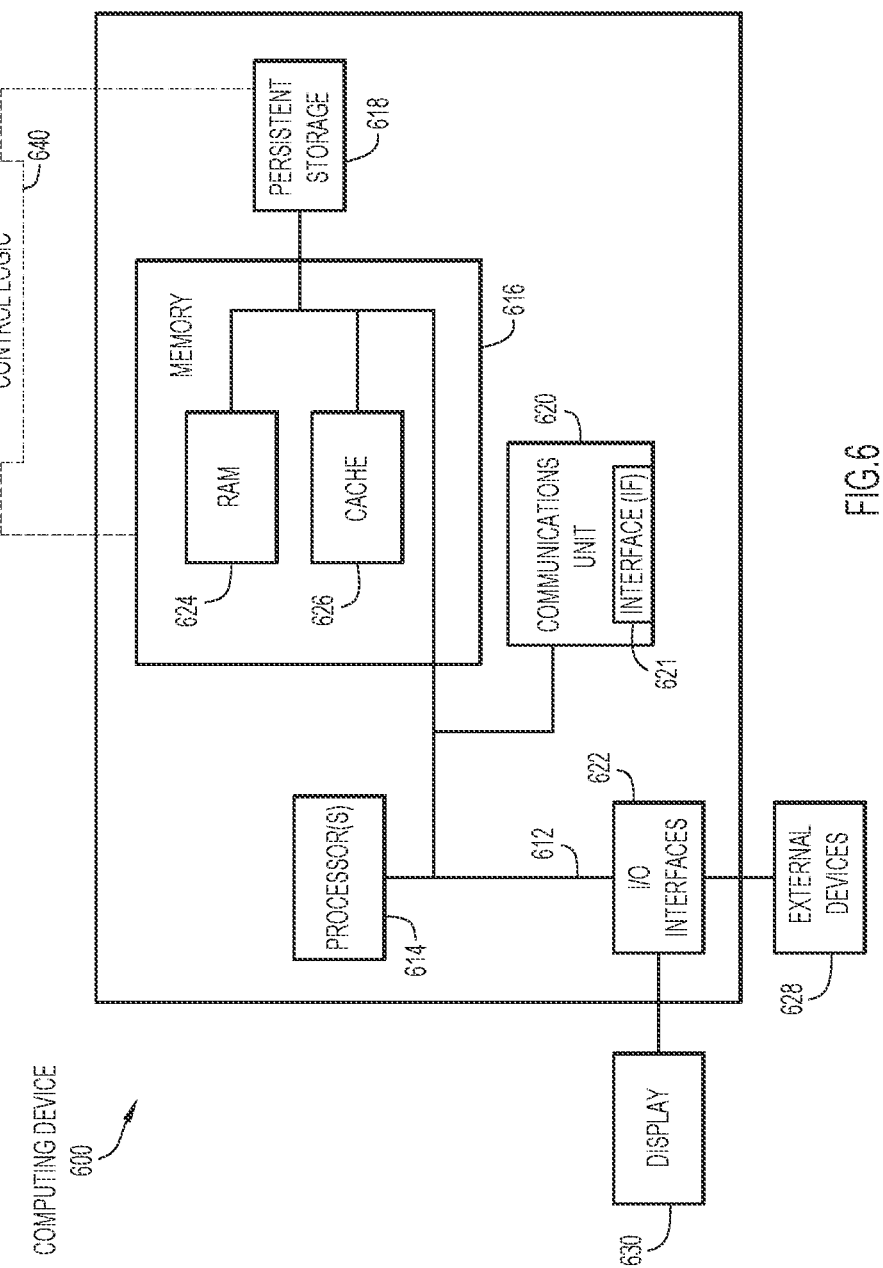

THIRD GENERATION PARTNERSHIP PROJECT (3GPP) PLUG AND PLAY (PNP) OPERATION IN A HYBRID OPEN RADIO ACCESS NETWORK (O-RAN) ENVIRONMENT

CROSS-REFERENCE TO RELATED APPLICATION

This application claims the benefit of priority under 35 U.S.C. § 119 to U.S. Provisional Patent Application Ser. No. 63/005,771, entitled "THIRD GENERATION PARTNERSHIP PROJECT PLUG AND PLAY (PNP) OPERATION IN A HYBRID OPEN RADIO ACCESS NETWORK (O-RAN) ENVIRONMENT," filed on Apr. 6, 2020, the disclosure of which application is hereby incorporated by reference in its entirety.

TECHNICAL FIELD

The present disclosure relates to network equipment and services.

BACKGROUND

Networking architectures have grown increasingly complex in communications environments, particularly mobile networking environments. Mobile communication networks have grown substantially as network operators integrate new features into communication architectures. As new features are integrated into a mobile communication system, there are significant challenges in facilitating network communications among network elements of the system.

BRIEF DESCRIPTION OF THE DRAWINGS

FIG. 6 is a hardware block diagram of a computing device that may perform functions associated with any combination of operations, in connection with the techniques depicted in FIGS. 3-5.

DESCRIPTION OF EXAMPLE EMBODIMENTS

Overview

Figure 1:
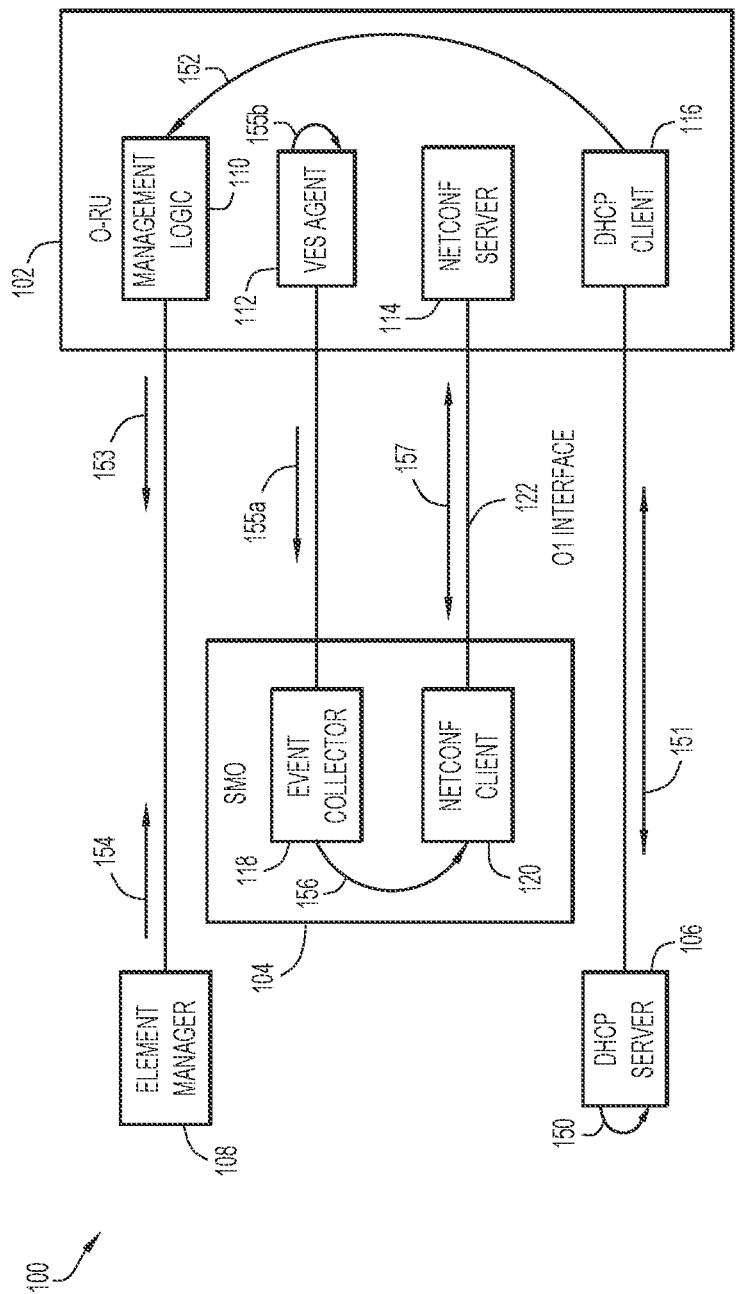
FIG. 1 is a diagram of a system illustrating features associated with a Third (3rd) Generation Partnership Project (3GPP) plug and play (PnP) architecture.

The Network Configuration Protocol (NETCONF), as prescribed at least by Internet Engineering Task Force (IETF) Request For Comments (RFC) 6241, 6022, 8071, etc. is a network management protocol that provides mechanisms to manage and/or control (e.g., install, manipulate, delete, etc.) the configuration of network devices. Techniques presented herein may provide refined logic for sending a pnfRegistration Virtual Network Function (VNF) event stream (VES) event/message to continue sending such events/messages until a Network Configuration Protocol (NETCONF) session is established to an "unknown" Open Radio Access Network (O-RAN or ORAN)-Radio Unit (O-RU) controller NETCONF client. The establishment of a NETCONF session to a "known" O-RU controller NETCONF client, such as an ORAN-Distributed Unit (O-DU) NETCONF client, which may be triggered by a NETCONF Call Home procedure, may not terminate the repeated sending of the pnfRegistration event notifications.

In at least one example embodiment, a method is provided that may include establishing a first network configuration session between a first network entity and a second network entity, wherein the second network entity is identified in a list of one or more known network entities and the first network configuration session is established using one or more first network configuration session triggers; repeatedly transmitting one or more second network configuration session triggers to establish a second network configuration session between the first network entity and a third network entity, wherein the third network entity is not identified in the list of one or more known network entities; and only upon establishing the second network configuration session between the first network entity and the third network entity that is not identified in the list of one or more known network entities, stopping the transmitting of the one or more second network configuration session triggers.

Example Embodiments

Both Third (3rd) Generation Partnership Project (3GPP) and O-RAN entities are adopting common procedures based on the Open Network Automation Platform (ONAP) defined Virtual Network Function (VNF) Event Stream (VES) for signaling asynchronous notifications using JavaScript Object Notation (JSON) signaling, Representational State Transfer (REST) signaling, etc. to avoid the need to keep a persistent Network Configuration Protocol (NETCONF) session between a management system and a managed entity.

Specifically, 3GPP and ONAP are jointly defining a plug and play (PnP) capability that uses a newly defined Physical Network Function (PNF) Registration (pnfRegistration) VES event that can be used to indicate to a management system that a managed element is powered and ready to receive its configuration. Until the managed element receives a NETCONF establishment request, it is to continue repeatedly sending a pnfRegistration event to a configured and/or discovered event collector. The management system is to recover the Internet Protocol (IP) address(es) in the pnfRegistration VES event/message and use this to trigger the establishment of a NETCONF session with the managed element. This will hence trigger the managed element to cease sending pnfRegistration VES events/messages. As referred to herein, a pnfRegistration VES event/message may be referred to interchangeably as a pnfRegistration event/message.

FIG. 1 is a diagram of a system 100 illustrating features associated with an example 3GPP PnP architecture in relation to NETCONF session establishment utilizing the pnfRegistration event mechanism, as generally prescribed by 3GPP Technical Specification (TS) 32.509. System 100 includes an ORAN-Radio Unit (O-RU) 102, a System or Service Management and Orchestration (SMO) entity 104, a Dynamic Host Configuration Protocol (DHCP) server 106, and an element manager 108. In some instances, SMO entity 104 may be referred to more generally as any of a Network Management System (NMS), a management system/entity/element, and/or the like. In some instances, element manager 108 functionality may be subsumed into the SMO 104.

As illustrated in FIG. 1, O-RU 102 may include management logic 110, a Virtual Network Function (VNF) Event Stream (VES) agent 112, a NETCONF server 114, and a DHCP client 116. SMO 104 may include an event collector 118 and a NETCONF client 120. O-RU 102 may interface with SMO 104, DHCP server 106, and element manager (EM) 108. More specifically for O-RU 102, management logic 110 may interface with element manager 108, VES agent 112 may interface with collector 118, NETCONF server 114 may interface with NETCONF client 120 via an O-RAN defined O1 interface 122, and DHCP client 116 may interface with DHCP server 106.

In general, a NETCONF server, such as NETCONF server 114, is a policy control point in a managed device that terminates the NETCONF protocol and manages interactions with the device's configuration management datastore (not shown in FIG. 1) that can be maintained at the device. In some instances, a NETCONF server can implement Access Control based on a NETCONF Access Control Model to define privileges to the configuration datastore (e.g., read access, write access, etc.). In general, a NETCONF client, such as NETCONF client 120, is a network management function that terminates the NETCONF protocol and interacts with a NETCONF server to get or edit the contents of the managed device's configuration datastore.

In general, the element manager 108 provides software and configuration information for O-RU 102 via management logic 110, which may perform various management/control operations for O-RU 102 (e.g., setting/configuring Radio Frequency (RF) parameters, frequencies, bands, signaling information, etc.). In general, the SMO 104 provides features as prescribed by O-RAN Alliance standards including, but not limited to, Provisioning Management Services, Fault Supervision and Management, Performance Assurance Management, Trace Management, File Management, etc. In general, an event collector, such as event collector 118, which may also be referred to as a Management service (MnS) consumer is a web server that terminates a Transport Layer Security (TLS) tunnel from a managed element (e.g., O-RU 102) and is a Representational State Transfer (REST or RESTful) collector for processing JSON messages received from VES agent 112, which may transmit such messages based on various events at O-RU 102 (e.g., fault events, measurement events, etc.). Event collector 118 may verify the source of notifications (using TLS) as well as the schema of VES notifications before forwarding a message to a message bus, where other functions can subscribe to particular notifications.

In general, a DHCP server, such as DHCP server 106, may provide IP addresses for one or more elements of a system (e.g., system 100) in response to DHCP solicit and/or request packets as may be transmitted by a DHCP client, such as DHCP client 416, using DHCP processes as are generally understood in the art.

The 3GPP/ONAP scenario illustrated in FIG. 1 is designed to operate where the managed element is in an environment with a single logical management system (e.g., SMO 104), meaning that there is always a one-to-one correspondence between the management system to which the managed element sends its pnfRegistration and the management system used to establish the NETCONF session with the managed element.

According to the 3GPP standards-based operations, a NETCONF session is established by configuring, at 150, DHCP server 106 with element manager 108 information, such as the Fully Qualified Domain Name (FQDN) and/or IP address(es) for element manager 108. At 151, DHCP client 116 obtains the DHCP based configuration information for element manager 108 (FQDN/IP address(es)) via a DHCP query/response exchange. At 152, management logic 110 is configured with element manager 108 identifying information (EM-ID). At 153, O-RU 102, via management logic 110, signals element manager 108 to obtain information regarding the SMO 104 event collector 118 (e.g., IP address, etc.) to which VES agent 112 is to repeatedly transmit the pnfRegistration event/message. At 154, element manager 154 responds with the information. At 155a, VES agent 112 begins repeatedly sending the pnfRegistration events/messages, which act as a session trigger for establishing the NETCONF session. The pnfRegistration events/messages include the IP address of NETCONF server 114. According to ONAP standards, the IP address is referred to as an 'oamV4IpAddress' (IPv4 IP address to be used by a manager to contact a PNF) or an 'oamV6IpAddress' (IPv6 IP address to be used by a manager to contact a PNF). At 156, event collector 118 passes the IP address of NETCONF server 114 to NETCONF client 120, which triggers NETCONF client 120 to initiate/establish a NETCONF session with NETCONF server, as shown at 157. Upon establishment of the NETCONF session, VES agent 112 stops repeatedly sending the pnfRegistration event towards event collector 118, as indicated at 155b.

Figure 2:
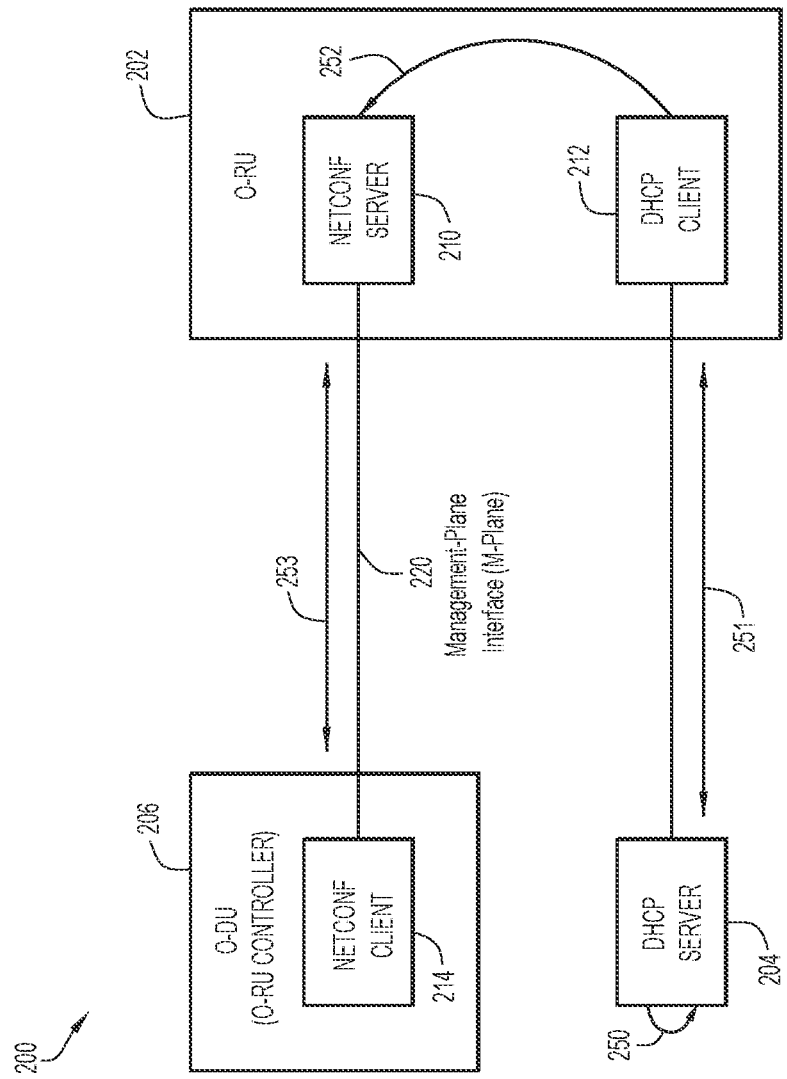
FIG. 2 is a diagram of a system illustrating features associated with an Open Radio Access Network (O-RAN) architecture.

In contrast to the management approach shown in FIG. 1, the O-RAN Alliance has defined an alternative management approach, whereby an O-RU can be operated in hybrid mode of operations in which it has a first logical NETCONF session with an ORAN-Distributed Unit (O-DU) and a second logical NETCONF session with an NMS (e.g., SMO 104). FIG. 2 is a diagram of a system 200 illustrating features associated with an example O-RAN architecture in relation to NETCONF session establishment. System 200 includes an O-RU 202, a DHCP server 204, and an O-DU 206. O-RU 202 includes a NETCONF server 210 and a DHCP client 212. O-DU 206, which is considered an O-RU controller in the architecture of FIG. 2, includes a NETCONF client 214.

For the architecture of FIG. 2, DHCP client 212 of O-RU 202 may interface with DHCP server 250 and NETCONF server 210 of O-RU 202 may interface with NETCONF client 214 via an O-RAN Alliance Working Group 4 (WG4) defined Management-plane (M-plane) interface 220.

NETCONF session establishment between O-RU 202 and O-DU 206 for FIG. 2 may involve configuring, at 250, the DHCP server 204 with NETCONF client 214 ID information, such as FQDN/IP address(es) for NETCONF client 214. The NETCONF client 214 ID information may be obtained by O-RU 202/DHCP client 212 via a DHCP exchange, as shown at 251. The NETCONF client 214 ID information can be configured for NETCONF server 210, as shown at 252. At 253, a NETCONF session is established between NETCONF server 210 and NETCONF client using an Internet Engineering Task Force (IETF) Call Home procedure, as prescribed at least by RFC 8071, which involves initiating, by the NETCONF server 210 a Transmission Control Protocol (TCP) connection with the NETCONF client 214 using the NETCONF client 214 ID in which initiating the TCP connection may act as a session trigger for establishing the NETCONF session. Using the TCP connection, the NETCONF client 214 initiates a Secure Shell/Transport Layer Security (SSH/TLS) session to the NETCONF server 210. Using the SSH/TLS session, the NETCONF client 214 then initiates a NETCONF session to the NETCONF server 210.

For the architecture of FIG. 2, the O-RAN Alliance has defined the NETCONF session between the O-RU 202 and the O-DU 206 via the M-plane interface 220 as persistent, compared to the O-RAN Alliance defined O1 interface (e.g., O1 interface 122, as shown in FIG. 1) that defines a NETCONF session between the O-RU and a NMS (e.g. SMO 104) as transient (or non-persistent); in which the non-persistent M-plane interface NETCONF session may be primarily used for configuration management procedures that may be immediately terminated following such procedures.

Furthermore for the O-RAN Alliance defined architecture of FIG. 2, the O-DU 206 is not defined to implement the ONAP VES Collector functionality, instead relying on the O-RU to perform a NETCONF Call Home to a discovered NETCONF client, which can be discovered, for example, using DHCP option 43.

Figure 3:
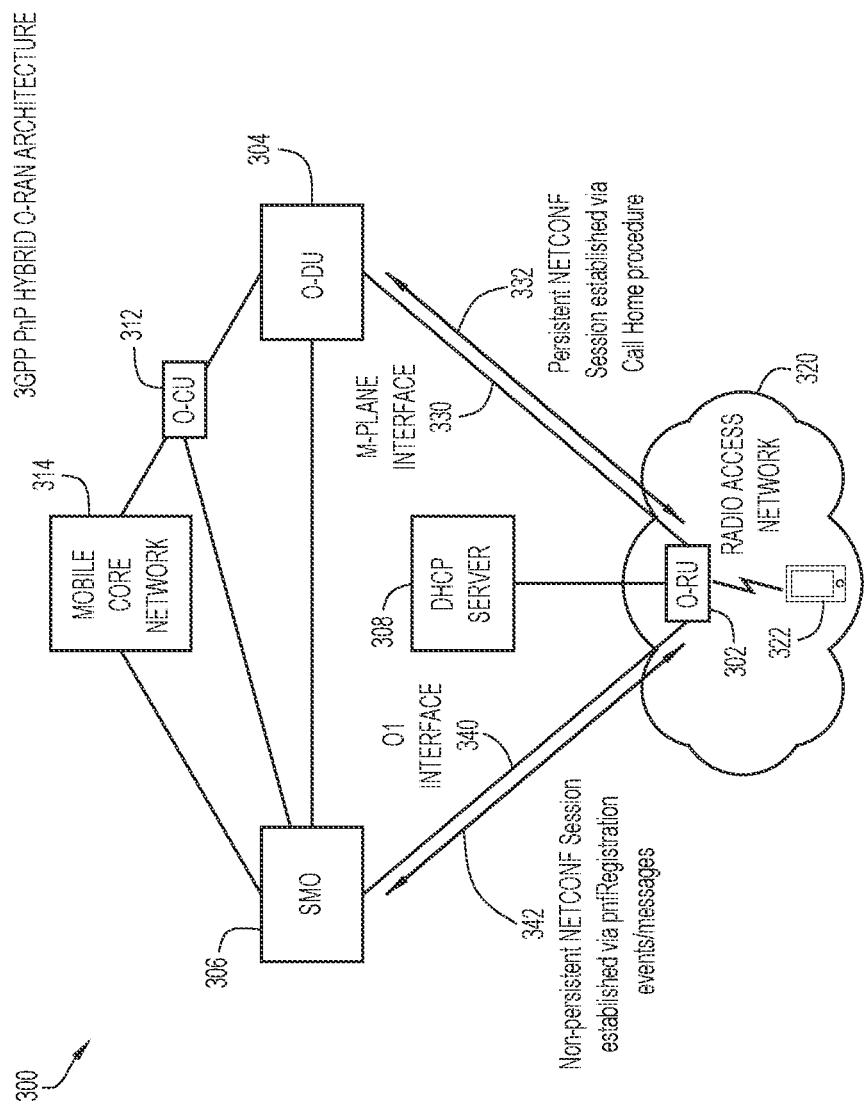
FIG. 3 is a diagram of a system illustrating features associated with a 3GPP plug and play (PnP) hybrid O-RAN architecture, according to an example embodiment.

Therefore, what is needed is to define the coexistence between an O-RU-to-O-DU NETCONF session establishment triggered by a NETCONF Call Home and the O-RU-to-NMS NETCONF session establishment triggered by a VES pnfRegistration event, as shown in system 300 of FIG. 3, which represents a 3GPP PnP hybrid O-RAN architecture, according to an example embodiment.

In at least one embodiment, system 300 may include an O-RU 302, an O-DU 304, an SMO 306, a DHCP server 308, an ORAN Central or Centralized Unit 312, and a Mobile Core Network 314. Also shown in system 300 is a Radio Access Network (RAN) 320 and a user equipment (UE) 322. Although not illustrated in FIG. 3, it is to be understood that O-RU is configured with a VES agent and a NETCONF server; SMO 306 is configured with an element manager, an event collector and a NETCONF client; and O-DU is configured with a NETCONF client.

For system 300, O-RU 302 may interface with O-DU 304, DHCP server 308, and SMO 306. The NETCONF server of O-RU 302 and the NETCONF client of O-DU 304 may interface via an M-plane interface 330 for a persistent NETCONF session 332 established via the Call Home procedure. Further, the NETCONF server of O-RU 302 and the NETCONF client of SMO 306 may interface via an O1 interface 340 for a non-persistent NETCONF session 342 established via one or more pnfRegistration events/messages (e.g., session triggers).

O-DU 304 may further interface with O-CU 312, which may further interface with mobile core network 314. SMO 306 may also interface with mobile core network 314. Although not shown, mobile core network 314 may further interface with one or more external networks such as the Internet, Ethernet networks, etc.

Generally, O-RU 302 may terminate any combination of a cellular and/or wireless air interface for any combination of Radio Access Technology (RAT) types (sometimes referred to more generally as 'accesses') for RAN 320 such as, but not limited to: non-3GPP unlicensed spectrum accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; cellular accesses such as 3GPP licensed spectrum accesses (e.g., 3rd Generation (3G), 4G/LTE, 5G, and/or next Generation (nG) accesses) and/or 3GPP unlicensed spectrum accesses (e.g., Licensed-Assisted Access (LAA), enhanced LAA (eLAA), further enhanced LAA (feLAA), and New Radio Unlicensed (NR-U)); Citizen Broadband Radio Service (CBRS) accesses; combinations thereof; and/or the like.

Thus, O-RU 402 may be inclusive of any configuration/combination of 3GPP 4G/LTE evolved Node Bs (eNBs or eNodeBs), 5G next Generation Node Bs (gNBs or gNodeBs), and/or any other next Generation access nodes that may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., Wi-Fi®, 4G/LTE, 5G, nG, CBRS, etc.) through which one or more UE, such as UE 322, may utilize to connect to O-RU 302 for one or more sessions (e.g., voice, video, data, gaming, combinations thereof, etc.).

Generally, O-DU 304 (also sometimes referred to as a baseband unit) may provide lower level operations of the radio signal processing stack, such as Radio Link Control (RLC), Medium Access Control (MAC), and physical (PHY) layer operations, such as digital processing, including signal modulation, encoding, and scheduling, among others. The O-DU interfaces with O-CU 312, which further interfaces with mobile core network 314, which may be configured as any combination of a 4G/LTE core, typically referred to as the Evolved Packet Core or System (EPC/EPS), a 5G core or system (5GC/5GS), a next Generation core or system (nG), and/or the like. The O-CU 312 may provide upper level operations of a radio signal processing stack, such as Packet Data Convergence Protocol (PDCP) functions and radio resource control, among others. The split of operations of a radio signal processing stack among between an O-DU and O-CU can be varied depending on implementation and/or configuration of a given RAN/network architecture.

In various embodiments, user equipment may be associated with any electronic device, machine, robot, etc. wishing to initiate a flow in a system. The terms 'device', 'electronic device', 'automation device', 'computing device', 'machine', 'robot', 'client', 'client device', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a desktop computer, a cellular telephone, a smart phone, an IP phone, any other device and/or combination of devices, component, element, and/or object capable of initiating voice, audio, video, media, or data exchanges within a system.

As has been described above, using the current O-RAN based definition for sending pnfRegistration events/messages within the architecture of FIG. 3, O-RU 302 can simultaneously trigger the pnfRegistration event/message transmissions toward SMO 306 and the NETCONF Call Home procedure toward O-DU 304. However, if the NETCONF Call Home procedure to the O-DU 304 completes first, the O-RU 302, according to current ONAP specifications, will cease sending the pnfRegistration events/messages to the event collector of SMO, possibly meaning that the registration procedure does not complete and that no NETCONF session may be established between the SMO 306 and the O-RU 302.

Techniques presented herein may provide refined logic for sending pnfRegistration events/messages in order to continue sending such messages until a NETCONF session is established to an unknown O-RU controller, such as an NMS/SMO. For these techniques, the establishment of a NETCONF session to a discovered or "known" O-RU controller, such as an O-DU, which was triggered by a NETCONF Call Home procedure, may not terminate the repeated sending of the pnfRegistration event notifications to the SMO.

Figure 4:
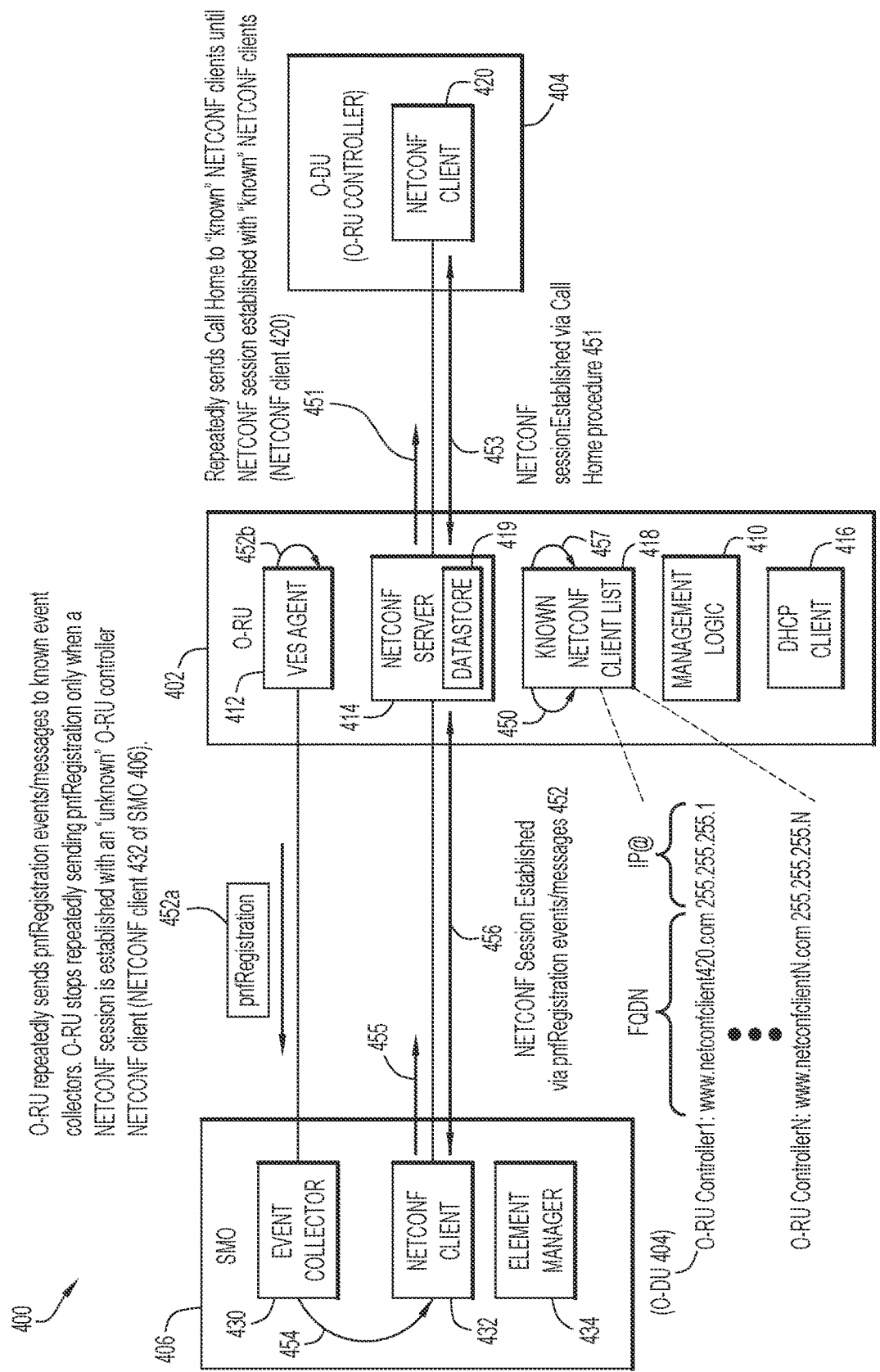
FIG. 4 is a diagram of a system in which techniques may be implemented to facilitate 3GPP PnP operations in a 3GPP PnP hybrid O-RAN architecture for establishing network configuration sessions among multiple network entities, according to an example embodiment.

Referring to FIG. 4, FIG. 4 is a block diagram of a system 400 in which techniques may be implemented to facilitate 3GPP PnP operations in a hybrid O-RAN architecture for establishing network configuration sessions among multiple network entities, according to an example embodiment. In particular, techniques provided via system 400 may facilitate establishing a NETCONF session between an O-RU 402 and an O-DU 404 utilizing the Call Home process and also establishing a NETCONF session between O-RU 402 and an SMO 406 utilizing the pnfRegistration event process.

System 400 includes an O-RU 402, an O-DU 404, and an SMO 406. O-RU 402 may include management logic 410, a VES agent 412, a NETCONF server 414, and a DHCP client 416. O-RU 402 may also be configured/provisioned with a list of "known" NETCONF clients via a known NETCONF client list 418. NETCONF server 414 may include a NETCONF datastore 419, which may include information for various NETCONF sessions, as prescribed by RFC 6022. O-DU 404 may include a NETCONF client 420. SMO 406 may include an event collector 430, a NETCONF client 432, and an element manager 434. Although not illustrated in FIG. 4 for purposes of brevity only to illustrate various features associated with O-RU 402, it is to be understood that system 400 may be implemented similar to system 300 of FIG. 3 to facilitate 3GPP PnP operations in a hybrid O-RAN architecture.

For the embodiment of FIG. 4, the difference between "known" and "unknown" O-RU Controller NETCONF clients may be defined such that a "known" O-RU controller NETCONF client (e.g., for O-DU 404) can either be discovered using the DHCP options (e.g., DHCP Option 43 for DHCP version 4 (DHCPv4) or Option 17), provisioned by an existing NETCONF client, and/or or statically configured. In some instances, for example, an existing NETCONF client for an O-DU could configure a backup NETCONF client into the list to be used in case of a failure. Other variations can be envisioned for which an existing NETCONF client may configure "known" NETCONF client(s) into the list.

For instances involving DHCP discovery, NETCONF client information could be encoded as a vendor specific option in a DHCP Option 43 for DHCPv4 or Option 17. In one instance, an example of such encoding may include that when a Type corresponds to an O-RU controller IP address, the value encodes IPv4 address(es) in a hexadecimal format. For example, a single server with an IPv4 address 198.185.159.144 will be encoded in an Option 43 Type Length Value (TLV) object as: Type: 0x81, Length: 0x04 26, Value: C6 B9 9F 90.

For the embodiment of FIG. 4, consider that the list of "known" NETCONF clients included in known NETCONF client list 418 may include an IP address (@), such as an IP version 4 (IPv4) address and/or IP version 6 (IPv6) address, and/or a Fully Qualified Domain Name (FQDN) (e.g., "controller.operator.com") for the "known" clients.

An example list for known NETCONF client list 418 is illustrated in FIG. 4 for an 'N' number of NETCONF clients for corresponding O-RU controllers in which an FQDN and an IPv4 address is provided for NETCONF client 420 of O-DU 404 (O-RU Controller1) thru the N number of NETCONF clients for O-RU controllers. The example format for known NETCONF client list 418 shown in FIG. 4 is provided for illustrative purposes only, and is not meant to limit the broad scope of the present disclosure. Other encoding formats could be used, as discussed above, for example, and thus, are clearly within the scope of the present disclosure.

For embodiments herein, the logic for sending the pnfRegistration events/messages towards the event collector of SMO 406 is enhanced such that it is repeated, potentially in a periodic manner, until an O-RU controller NETCONF client corresponding to an "unknown" O-RU controller NETCONF client (e.g., the NETCONF client 432 for SMO 406) establishes a NETCONF session with the O-RU 402. An O-RU controller NETCONF client is "unknown" to the O-RU 402 if it has not been discovered using the procedures defined above (e.g., using the DHCP options, being provisioned by an existing NETCONF client, and/or being statically configured). As referred to herein, the term 'discovered' may be inclusive of configuration/provisioning the known NETCONF client list 418 via of any combination of using the DHCP options via a DHCP client/server exchange, being provisioned by an existing NETCONF client, and/or being statically configured.

Recall, that the DHCP exchange for the 3GPP PnP architecture of FIG. 1 is for the O-RU to recover the element manager FQDN/IP@(s). The O-RU 402 is provisioned via element manager 434 with the FQDN/IP@(s) for known event collectors, such as event collector 430, rather than known NETCONF clients. Therefore, the only "known" O-RU controller NETCONF client included in the known NETCONF client list 418 for the embodiment of FIG. 4 may identify the FQDN/IP@(s) for NETCONF clients of O-DUs (e.g., NETCONF client 420 of O-DU 404). This provisioning process is not defined by 3GPP and therefore is not defined to be multi-vendor interoperable; as such, each vendor will communicate with their own element manager.

Thus, for the 3GPP PnP hybrid O-RAN architecture as illustrated in FIG. 4, O-RU 402 stops sending the pnfRegistration towards SMO 406 (e.g., event collector 118) only when a NETCONF session is established to the NETCONF client 432, which is not in the list of discovered/provisioned/configured "known" NETCONF clients.

Consider an operational example in which known NETCONF client list 450 is configured/provisioned at 450 to include the FQDN/IP@(s) for NETCONF client 420. At 451, O-RU 402 initiates (e.g., triggers) a first NETCONF session toward "known" NETCONF client 420 using the Call Home procedure, as discussed above, and repeatedly (e.g., in a periodic manner) performs the Call Home to the list of discovered "known" clients (e.g., initiating a TCP connection). In parallel with performing the Call Home procedure, O-RU 402 initiates (via VES agent 412) repeatedly sending, at 452a, pnfRegistration events/messages (e.g., NETCONF session triggers) toward known event collectors (e.g., event collector 430). The O-RU stops repeatedly sending the pnfRegistration events/messages at 452a only when a NETCONF session is established with an "unknown" O-RU controller NETCONF client (e.g., NETCONF client 432 of SMO 406).

At 453, consider that a NETCONF session 453 is established between NETCONF server 414 and NETCONF client 420 of O-DU 404. According to embodiments herein, O-RU 402 does not stop sending the pnfRegistration events/messages towards event collector 430 as would otherwise be performed according to current ONAP standards, but rather continues repeatedly sending (452a) the pnfRegistration events/messages (e.g., session triggers) towards event collector 430 until a NETCONF session is established with an "unknown" NETCONF client (i.e., a NETCONF client not included in the known NETCONF client list 418). Accordingly, this qualification avoids the O-RU 402 from ceasing to repeatedly (e.g., on a periodic basis) sending the pnfRegistration event due to the establishment of a NETCONF session following the Call Home procedures to the O-DU 404 when operating in a hybrid management environment (e.g., involving multiple O-RU controllers).

Based on obtaining a given pnfRegistration event/message (e.g., session trigger), consider, at 454, that event collector 430 provides the FQDN/IP@ for NETCONF server 414 to NETCONF client 432 and, at 455, NETCONF client 432 initiates a NETCONF session with NETCONF server 414, via a NETCONF hello message, to establish a NETCONF session between NETCONF client 432 and NETCONF server 414, as shown at 456. The NETCONF server 414 learns the FQDN/IP@ of the NETCONF client 432 through establishment of the NETCONF session 456. NETCONF is layered on top of a transport protocol, which is typically used to derive a NETCONF username. RFC 6022 specifies that the username is the client identity that is authenticated by the NETCONF transport protocol and further specifies that this included in a device's datastore, such as datastore 419 for NETCONF server 414, for NETCONF management sessions as shown in TABLE 1, below; thus, providing for the ability of NETCONF server 414 to identify the FQDN and/or IP@ of NETCONF client 432 for the session established at 456.

TABLE 1

EXAMPLE NETCONF SERVER DATASTORE INFORMATION leaf username {
  type string;
  mandatory true;
  description
    "The username is the client identity that was authenticated by
    the NETCONF transport protocol. The algorithm used to
    derive the username is NETCONF transport protocol specific
    and in addition specific to the authentication mechanism used
    by the NETCONF transport protocol.";
}
leaf source-host {
  type inet:host;
  description
    "Host identifier of the NETCONF client. The value returned is
    implementation specific (e.g., hostname, IPv4 address, IPv6
    address)";
}

Upon or during establishment of the NETCONF session (456), O-RU 402 can perform one or more lookup(s), at 457, for the known NETCONF client list 418 using the FQDN/IP@ for NETCONF client 432 (obtained via the NETCONF hello at 455) to determine that the NETCONF client 432 is not identified in the list 418. For example, in one instance a first lookup can be performed on datastore 419 using the FQDN of NETCONF client 432 to determine the IP address for NETCONF client 432 and a second lookup can be performed against the known NETCONF client list 418 to determine that NETCONF client 432 is not identified in the known NETCONF client list. Other lookup variations can be envisioned depending on the encoding format of the list 418, etc. Thus, the NETCONF server 414 determines that the NETCONF session 456 is with "unknown" NETCONF client 432 and O-RU 402 stops repeatedly sending the pnfRegistration events/messages towards event collector 430 at 452b.

Accordingly, embodiments herein provide refined logic for sending pnfRegistration events/messages such that such events/messages will continue to be sent until a NETCONF session is established with an "unknown" O-RU controller NETCONF client. Through the refined provided by embodiments herein, the establishment of a NETCONF session to a "known" O-RU controller NETCONF client, such as an O-DU NETCONF client that may be triggered by a NETCONF Call Home procedure does not terminate the repeated sending of the pnfRegistration event notifications.

Figure 5:
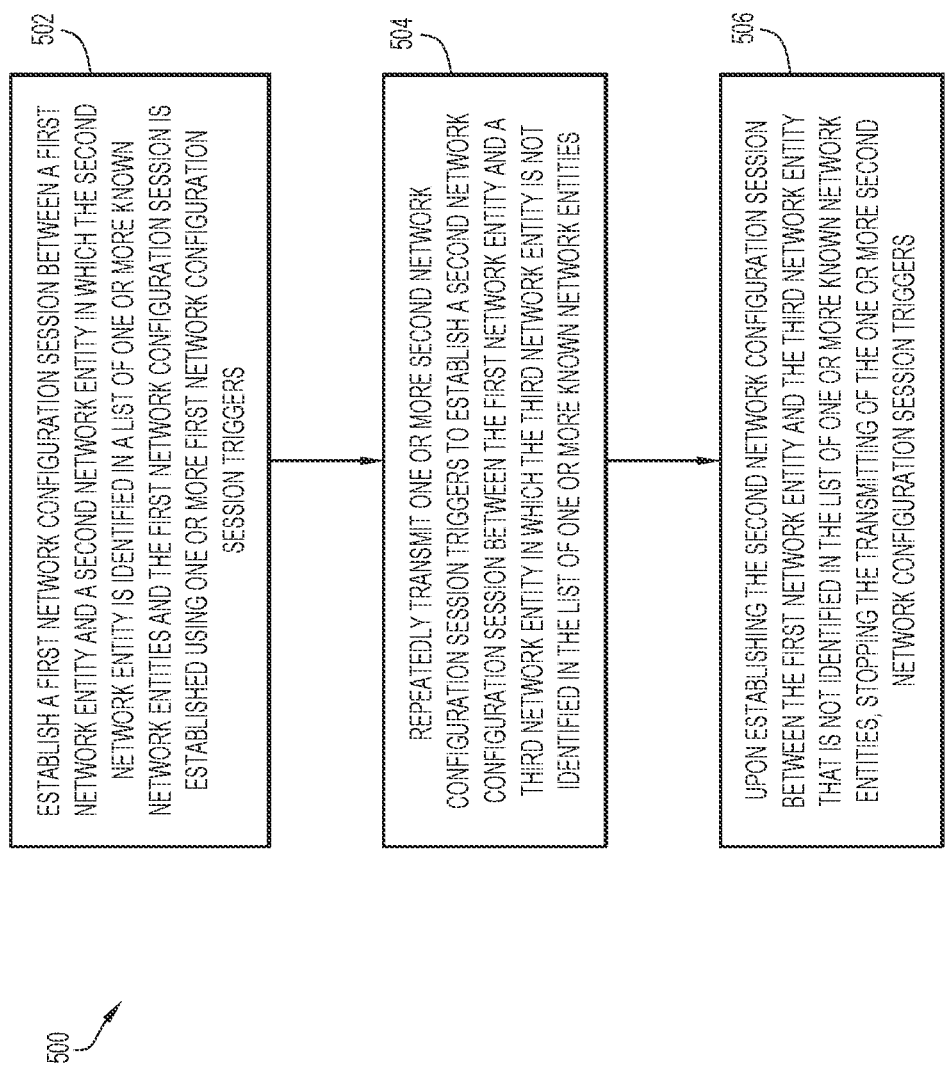
FIG. 5 is a flow chart depicting a method according to an example embodiment.

Referring to FIG. 5, FIG. 5 is a flow chart depicting a method 500 according to an example embodiment. In particular, method 500 illustrates example operations that may be performed by an O-RU, such as O-RU 402, in order to establish network configuration sessions (e.g., NETCONF sessions) with multiple network entities (e.g., management entities, control entities, etc.).

At 502, the method may include establishing a first network configuration session between a first network entity (e.g., NETCONF server 414 of O-RU 402) and a second network entity (e.g., NETCONF client 420 of O-DU 404) in which the second network entity is identified in a list of one or more known network entities (e.g., known NETCONF client list 418) and the first network configuration session is established using one or more first network configuration session triggers (e.g., initiating a TCP connection from NETCONF server 414 toward NETCONF client 420).

At 504, the method may include repeatedly transmitting one or more second network configuration session triggers (e.g., pnfRegistration events/messages) to establish a second network configuration session between the first network entity (e.g., NETCONF server 414) and a third network entity (e.g., NETCONF client 432 of SMO 406) in which the third network entity is not identified in the list of one or more known network entities.

At 506, the method may include, upon establishing the second network configuration session between the first network entity (e.g., NETCONF server 414) and the third network entity (e.g., NETCONF client 432) that is not identified in the list of one or more known network entities, stopping the transmitting of the one or more second network configuration session triggers. The method may include performing one or more lookups on the list using the FQDN and/or IP address of the third network entity to determine that the third network entity is not identified in the list of one or more known network entities.

Referring to FIG. 6, FIG. 6 illustrates a hardware block diagram of a computing device 600 that may perform functions associated with operations discussed herein in connection with the techniques depicted in FIGS. 3-5. In various embodiments, a computing device, such as computing device 600 or any combination of computing devices 600, may be configured an elements/devices/nodes as discussed for the techniques depicted in connection with FIGS. 3-5. In one embodiment, computing device 600 may be configured as an O-RU, such as O-RU 402. However, in some embodiments, computing device 600 may be configured as any of an O-DU, such as O-DU 404, an SMO, such as SMO 406, and/or another other network element/entity as discussed for embodiments herein.

It should be appreciated that FIG. 6 provides only an illustration of one embodiment and does not imply any limitations with regard to the environments in which different embodiments may be implemented. Many modifications to the depicted environment may be made.

As depicted, the computing device 600 includes a bus 612, which provides communications between computer processor(s) 614, memory 616, persistent storage 518, at least one communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media, which can be inclusive on non-transitory computer readable storage media. In the depicted embodiment, memory 616, which may be inclusive of one or more memory element(s), includes random access memory (RAM) 624 and cache memory 626. In general, memory 616 can include any suitable volatile or non-volatile computer readable storage media. Instructions for control logic 640 may be stored in memory 616 and/or persistent storage 618 for execution by processor(s) 614.

When the processor(s) 614 execute control logic 640, the processor(s) 614 are caused to perform the operations described above in connection with FIGS. 3-5. For example, when control logic 640 is configured for an O-RU, such as O-RU 402, when processor(s) 614 execute control logic 640, the processor(s) 614 may be caused to perform operations such as, provisioning a known NETCONF client list with FQDN/IP address(es) for one or more known network controllers; establishing a first network configuration session (e.g., NETCONF session) between the NETCONF server 414 and the NETCONF client 420 of O-DU 404 in which NETCONF client is identified in a list of one or more known network entities (e.g., known NETCONF client list 418) and the first network configuration session is established using one or more first network configuration session triggers (e.g., triggering a TCP connection toward NETCONF client 420); repeatedly transmitting one or more second network configuration session triggers (pnfRegistration events/messages) to establish a second network configuration session between the NETCONF server 414 of the O-RU 402 and NETCONF client 432 of SMO 406 in which the NETCONF client 432 is not identified in the list of one or more known network entities; and upon establishing the second network configuration session with the "unknown" NETCONF client 432 that is not identified in the list of one or more known network entities, stopping the transmitting of the one or more second network configuration session triggers.

For embodiments in which computing device 600 is configured as any other network element/entity discussed herein (e.g., O-DU 404, SMO 406, etc.), when processor(s) 614 execute control logic 640, the processor(s) 614 may be caused to perform operations as discussed herein with reference to FIGS. 3-5.

One or more programs and/or other logic may be stored in persistent storage 618 for execution by one or more of the respective computer processors 614 via one or more memory element(s) of memory 616. The persistent storage 618 may be a magnetic hard disk drive, a solid-state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems, networks, and/or devices. In these examples, each communications unit 620 may include at least one interface (IF) 621, which may facilitate communications with systems, networks, and/or devices utilizing any combination of hardware, software, etc. to facilitate one or more connections for communications discussed herein. Accordingly, communications unit 620 may provide communications through the use of any combination of physical and/or wireless communications links.

I/O interface(s) 622 allows for input and output of data with other devices that may be connected to computing device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

In one form, a computer-implemented method is provided that may include establishing a first network configuration session between a first network entity and a second network entity, wherein the second network entity is identified in a list of one or more known network entities and the first network configuration session is established using one or more first network configuration session triggers; repeatedly transmitting one or more second network configuration session triggers to establish a second network configuration session between the first network entity and a third network entity, wherein the third network entity is not identified in the list of one or more known network entities; and only upon establishing the second network configuration session between the first network entity and the third network entity that is not identified in the list of one or more known network entities, stopping the transmitting of the one or more second network configuration session triggers.

In one instance, the first network entity may be a Network Configuration Protocol (NETCONF) server of an Open Radio Access Network (O-RAN) Radio Unit (O-RU). In one instance, the second network entity may be a NETCONF client of an O-RAN Distributed Unit (O-DU) and the third network entity may be a NETCONF client of a System Management and Orchestration (SMO) entity. The O-RU may interface with the O-DU via an O-RAN management plane (M-plane) interface and the O-RU may interfaces with the O-RU via an O-RAN O1 interface.

In one instance, the one or more first network configuration session triggers may include initiating a Transmission Control Protocol (TCP) connection between the first network entity and the second network entity. In one instance, the one or more second network configuration session triggers may include one or more Third Generation Partnership Project (3GPP) Physical Network Function Registration (pnfRegistration) messages In one instance, repeatedly transmitting the one or more second network configuration session triggers may include transmitting the one or more second network configuration session triggers on a periodic basis until the second network configuration session is established.

The method may further include provisioning the list of one or more known network entities for the first network entity in which the provisioning includes one or more of: discovering one or more known network entities for the list by the first network entity using a Dynamic Host Configuration Protocol (DHCP) process; provisioning one or more known network entities for the list by a Network Configuration Protocol (NETCONF) client; and providing a static configuration of one or more known network entities for the list. In one instance, the method may further include performing a lookup on the list of one or more known network entities using at least one of a Fully Qualified Domain Name and an Internet Protocol address of the third network entity to determine that the third network entity is not identified in the list of one or more known network entities.

In one form, another computer-implemented method is provided that includes establishing a first network configuration session between a first network entity and a second network entity in which the second network entity is identified in a list of one or more known network entities and the first network configuration session is triggered using one or more first network configuration session triggers; and repeatedly sending one or more second network configuration session triggers until a second network configuration session is established between the first network entity and a third network entity, wherein the third network entity is not identified in the list of one or more known network entities The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets. Internet Protocol (IP) addresses discussed herein and in the claims can include IP version 4 (IPv4) and/or IP version 6 (IPv6) addresses.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Data or information relating to operations described herein may be stored within any conventional or other data structures (e.g., files, arrays, lists, stacks, queues, records, etc.) and may be stored in any desired storage unit (e.g., database, data or other repositories, queue, etc.). The data or information transmitted between entities may include any desired format and arrangement, and may include any quantity of any types of fields of any size to store the data. The definition and data/information model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), wireless LAN (WLAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, WLAN, Internet, Intranet, Virtual Private Network (VPN), Ethernet network, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. A database system may be included within or coupled to a server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart(s) and block diagram(s) in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    establishing a first network configuration session between a first network entity and a second network entity, wherein the second network entity is identified in a list of one or more known network entities stored at the first network entity and the first network configuration session is established using one or more first network configuration session triggers;
    repeatedly transmitting one or more second network configuration session triggers to establish a second network configuration session between the first network entity and a third network entity, wherein the third network entity is not identified in the list of one or more known network entities stored at the first network entity; and
    upon establishing the second network configuration session with the third network entity that is not identified in the list of one or more known network entities stored at the first network entity, stopping the transmitting of the one or more second network configuration session triggers.

2. The method of claim 1, wherein the first network entity is a Network Configuration Protocol (NETCONF) server of an Open Radio Access Network (O-RAN) Radio Unit (O-RU).

3. The method of claim 2, wherein the second network entity is a NETCONF client of an O-RAN Distributed Unit (O-DU) and the third network entity is a NETCONF client of a System and Management Orchestration (SMO) entity.

4. The method of claim 3, wherein the O-RU interfaces with the O-DU via an O-RAN management plane (M-plane) interface and the O-RU interfaces with the SMO entity via an O-RAN O1 interface.

5. The method of claim 1, wherein the one or more first network configuration session triggers includes initiating a Transmission Control Protocol (TCP) connection between the first network entity and the second network entity.

6. The method of claim 1, wherein the one or more second network configuration session triggers include one or more Third Generation Partnership Project (3GPP) Physical Network Function Registration (pnfRegistration) messages.

7. The method of claim 1, wherein repeatedly transmitting the one or more second network configuration session triggers includes transmitting the one or more second network configuration session triggers on a periodic basis until the second network configuration session is established.

8. The method of claim 1, further comprising:
    provisioning the list of one or more known network entities for the first network entity.

9. The method of claim 8, wherein the provisioning comprises one or more of:
    discovering one or more known network entities for the list by the first network entity using a Dynamic Host Configuration Protocol (DHCP) process;

provisioning one or more known network entities for the list by a Network Configuration Protocol (NETCONF) client; and providing a static configuration of one or more known network entities for the list.

10. The method of claim 1, further comprising:

performing a lookup on the list of one or more known network entities using at least one of a Fully Qualified Domain Name and an Internet Protocol address of the third network entity to determine that the third network entity is not identified in the list of one or more known network entities.

11. The method of claim 1, wherein establishing the first network configuration session is performed prior to establishing the second network configuration session and does not stop the transmitting of the one or more second network configuration session triggers.

12. One or more non-transitory computer readable storage media encoded with instructions that, when executed by a processor, cause the processor to perform operations, comprising:

establishing a first network configuration session between a first network entity and a second network entity, wherein the second network entity is identified in a list of one or more known network entities stored at the first network entity and the first network configuration session is established using one or more first network configuration session triggers;

repeatedly transmitting one or more second network configuration session triggers to establish a second network configuration session between the first network entity and a third network entity, wherein the third network entity is not identified in the list of one or more known network entities stored at the first network entity; and upon establishing the second network configuration session with the third network entity that is not identified in the list of one or more known network entities stored at the first network entity, stopping the transmitting of the one or more second network configuration session triggers.

13. The media of claim 12, wherein the first network configuration session and the second network configuration session are Network Configuration Protocol (NETCONF) sessions.

14. The media of claim 12, wherein the one or more first network configuration session triggers includes initiating a Transmission Control Protocol (TCP) connection between the first network entity and the second network entity.

15. The media of claim 12, wherein repeatedly transmitting the one or more second network configuration session triggers includes transmitting the one or more second network configuration session triggers on a periodic basis until the second network configuration session is established.

16. The media of claim 12, the operations further comprising:

provisioning the list of one or more known network entities for the first network entity, wherein the provisioning comprises one or more of:

discovering one or more known network entities for the list by the first network entity using a Dynamic Host Configuration Protocol (DHCP) process;

provisioning one or more known network entities for the list by a Network Configuration Protocol (NETCONF) client; and providing a static configuration of one or more known network entities for the list.

17. A system comprising:

at least one memory element for storing data; and at least one processor for executing instructions associated with the data, wherein executing the instructions causes the system to perform operations, comprising:

establishing a first network configuration session between a first network entity and a second network entity, wherein the second network entity is identified in a list of one or more known network entities stored at the first network entity and the first network configuration session is established using one or more first network configuration session triggers;

repeatedly transmitting one or more second network configuration session triggers to establish a second network configuration session between the first network entity and a third network entity, wherein the third network entity is not identified in the list of one or more known network entities stored at the first network entity; and upon establishing the second network configuration session with the third network entity that is not identified in the list of one or more known network entities stored at the first network entity, stopping the transmitting of the one or more second network configuration session triggers.

18. The system of claim 17, wherein the first network entity is a Network Configuration Protocol (NETCONF) server of an Open Radio Access Network (O-RAN) Radio Unit (O-RU), and wherein the second network entity is a NETCONF client of an O-RAN Distributed Unit (O-DU) and the third network entity is a NETCONF client of a System and Management Orchestration (SMO) entity.

19. The system of claim 18, wherein the O-RU interfaces with the O-DU via an O-RAN management plane (M-plane) interface and the O-RU interfaces with the SMO entity via an O-RAN O1 interface.

20. The system of claim 17, wherein executing the instructions causes the system to perform further operations, comprising:

provisioning the list of one or more known network entities for the first network entity, wherein the provisioning comprises one or more of:

discovering one or more known network entities for the list by the first network entity using a Dynamic Host Configuration Protocol (DHCP) process;

provisioning one or more known network entities for the list by a Network Configuration Protocol (NETCONF) client; and providing a static configuration of one or more known network entities for the list.

* * * * *